(12) United States Patent
Sakato et al.

(10) Patent No.: US 12,272,079 B2
(45) Date of Patent: Apr. 8, 2025

(54) SIGNAL PROCESSING APPARATUS THAT DETECTS PHASE DIFFERENCES IN IMAGE SIGNALS, SIGNAL PROCESSING METHOD, AND STORAGE MEDIUM

(71) Applicant: CANON KABUSHIKI KAISHA, Tokyo (JP)

(72) Inventors: Kazuma Sakato, Kanagawa (JP); Yohei Horikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 370 days.

(21) Appl. No.: 17/725,635

(22) Filed: Apr. 21, 2022

(65) Prior Publication Data

US 2022/0343515 A1 Oct. 27, 2022

(30) Foreign Application Priority Data

Apr. 27, 2021 (JP) ................. 2021-075225

(51) Int. Cl.
*G06T 7/254* (2017.01)
*G06T 7/44* (2017.01)

(52) U.S. Cl.
CPC ........... *G06T 7/254* (2017.01); *G06T 7/44* (2017.01); *G06T 2207/20024* (2013.01); *G06T 2207/20224* (2013.01)

(58) Field of Classification Search
CPC . G06T 7/44; G06T 7/254; G06T 2207/20024; G06T 2207/20224
See application file for complete search history.

(56) References Cited

U.S. PATENT DOCUMENTS 8,605,179 B2 12/2013 Noguchi et al.
9,313,469 B2 4/2016 Kanda et al.
(Continued)

FOREIGN PATENT DOCUMENTS

JP 2012-027390 A 2/2012
JP 2016-224385 A 12/2016
(Continued)

OTHER PUBLICATIONS

S. W. Smith, The scientist and engineer's guide to digital signal processing. San Diego, Calif. California Technical Pub, 1997, Chapter 15, p. 1 (Year: 1997).*

(Continued)

*Primary Examiner* — Sean M Conner
*Assistant Examiner* — David Alexander Wambst
(74) *Attorney, Agent, or Firm* — Venable LLP

(57) ABSTRACT

A signal processing apparatus that can suppress degradation of accuracy of phase difference detection. An obtaining unit obtains a plurality of frames of image signals from a plurality of photoelectric conversion units, which receives light fluxes with different incident directions from an object, an information receiving unit receives saturation information indicating whether the obtained image signals are saturated, a filter arithmetic unit subjects the output image signals of the plurality of frames to filter processing, an evaluation value calculation unit calculates a multivalued saturation evaluation value indicating reliability of the image signals subjected to the filter processing using the saturation information of the image signals of the frames most recently output, and a phase difference detection unit determines whether to use the image signals subjected to the filter processing for phase difference detection based on the calculated saturation evaluation value.

13 Claims, 13 Drawing Sheets

(56) References Cited

U.S. PATENT DOCUMENTS

| | | |
|---|---|---|
| 9,742,984 B2 | 8/2017 | Kanda et al. |
| 9,967,451 B2 | 5/2018 | Takahashi et al. |
| 9,979,876 B2 | 5/2018 | Ikeda |
| 11,388,335 B2 | 7/2022 | Nakaoka et al. |
| 2012/0026372 A1 | 2/2012 | Noguchi et al. |
| 2014/0307134 A1 | 10/2014 | Kanda et al. |
| 2016/0191789 A1 | 6/2016 | Kanda et al. |
| 2016/0360093 A1 | 12/2016 | Ikeda |
| 2021/0112205 A1* | 4/2021 | Nakaoka .............. H04N 23/672 |

FOREIGN PATENT DOCUMENTS

| | | |
|---|---|---|
| JP | 6317548 B2 | 4/2018 |
| JP | 2020-205557 A | 12/2020 |
| WO | 2016/111175 A1 | 7/2016 |

OTHER PUBLICATIONS

Robert Oshana, 4—Overview of Digital Signal Processing Algorithms, Editor(s): Robert Oshana, In Embedded Technology, DSP Software Development Techniques for Embedded and Real-Time Systems, Newnes, 2006, pp. 59-121, ISBN 9780750677592, Chapter 4, pp. 90-95 (Year: 2006).*

Jan. 28, 2025 Japanese Official Action in Japanese Patent Appln. No. 2021-075225.

* cited by examiner

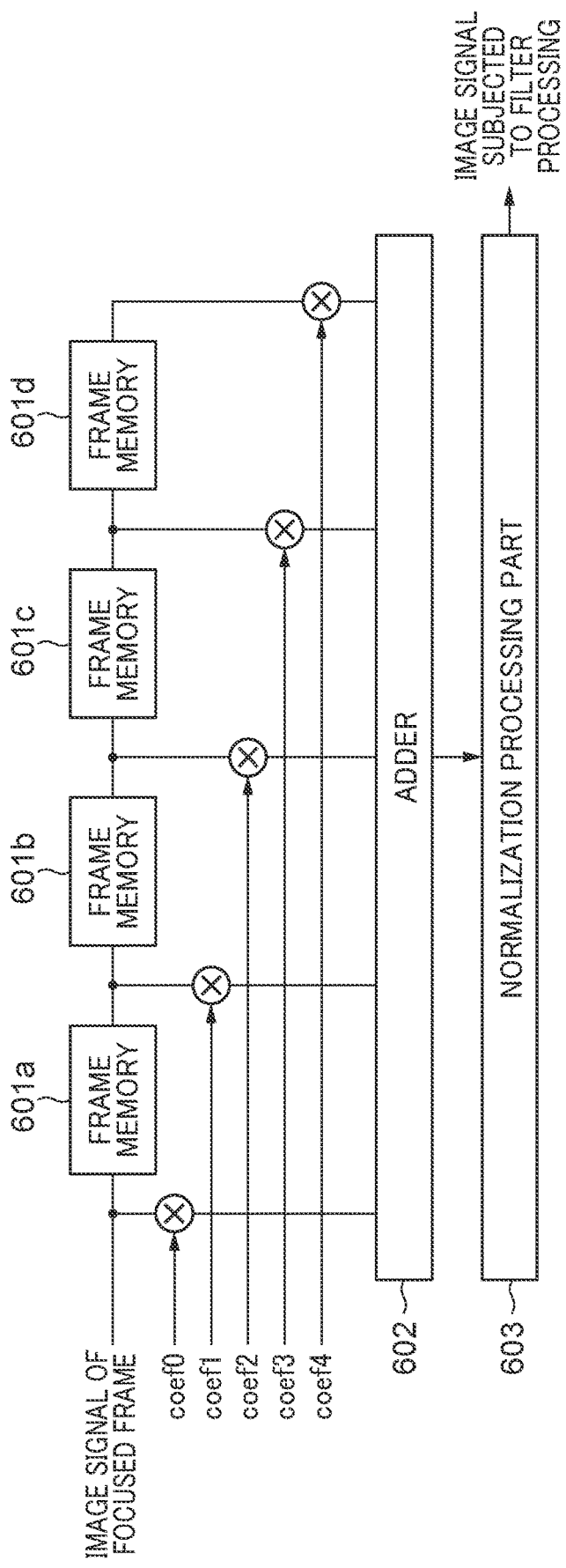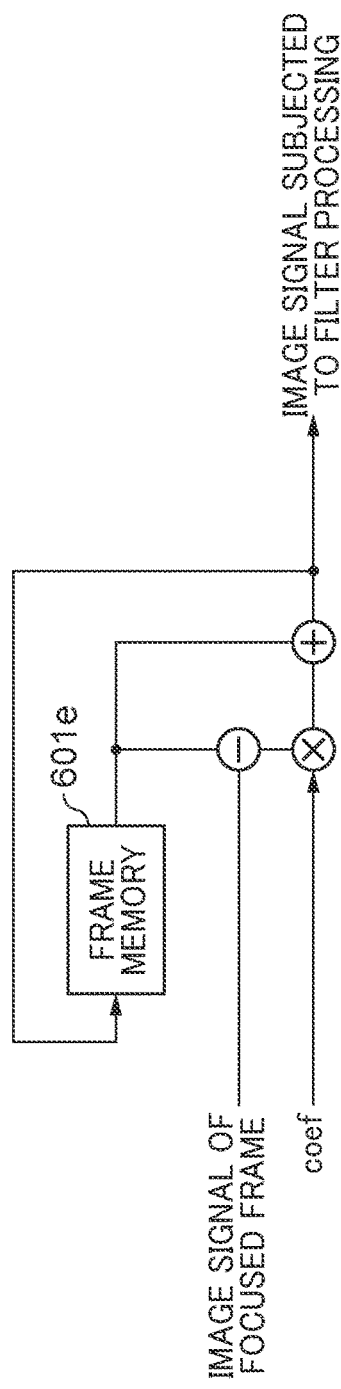

SIGNAL PROCESSING APPARATUS THAT DETECTS PHASE DIFFERENCES IN IMAGE SIGNALS, SIGNAL PROCESSING METHOD, AND STORAGE MEDIUM

BACKGROUND OF THE INVENTION

Field of the Invention

The present invention relates to a signal processing apparatus, a signal processing method, and a storage medium for detecting phase differences in image signals output by a plurality of photoelectric conversion elements of pixels of an image pickup device.

Description of the Related Art

There are known image pickup apparatus that execute focus detection using the phase difference method, which calculates the distance to the object by acquiring at least two image signals from the pixels of the image pickup device where light fluxes with different incident directions are photoelectrically converted, and detecting the phase difference (amount of shift) of these image signals. Also known is an image pickup apparatus that simultaneously calculates the distance to the object and creates a recorded image using image signals acquired from pixels (see, for example, see Japanese Laid-Open Patent Publication (kokai) No. 2012-27390). In the image pickup apparatus in Japanese Laid-Open Patent Publication (kokai) No. 2012-27390, each pixel of an image pickup device includes two photoelectric conversion elements divided to receive light fluxes with different incident directions that pass through one microlens. Then, image signals are acquired from the photoelectric conversion elements individually. In this manner, the signal for phase difference detection and the signal for image creation are acquired simultaneously from a single pixel.

In addition, the amount of light received by the pixels may be excessive, and the acquired image signals may be saturated. In this case, the image signals are not used for phase difference detection, which improves the accuracy of the calculation of the distance to the object, and thus the accuracy of the focus adjustment function. For example, as a result of photoelectric conversion in one of the two divided photoelectric conversion elements, when charge saturation occurs and charge leaks into the other photoelectric conversion element, image collapse occurs and the accuracy of phase difference detection decreases. Therefore, image signals acquired from pixels where charge leakage is occurring are excluded from phase difference detection (see, for example, Japanese Patent No. 6317548).

By the way, it is also known that using the image signals subjected to filter processing with respect to a time axis of the image signals of a plurality of frames output from the same pixel reduces noise mainly in low light conditions and improves the accuracy of the focus adjustment function by the phase difference method. In this case, of the image signals of a plurality of frames to be subjected to filter processing, when even an image signal of one frame is saturated, the accuracy of phase difference detection using the image signals subjected to the filter processing may be degraded. Therefore, it is conceivable to exclude such image signals subjected to filter processing from phase difference detection.

However, when even an image signal of one frame is saturated, excluding the image signals subjected to filter processing from the phase difference detection may lead to a decrease in the number of image signals subjected to filter processing used for phase difference detection, resulting in a decrease in the accuracy of phase difference detection.

SUMMARY OF THE INVENTION

The present invention provides a signal processing apparatus, a signal processing method, and a storage medium that suppress the degradation of the accuracy of phase difference detection.

Accordingly, the present invention provides a signal processing apparatus comprising at least one memory storing a program, and one or more processors which, by executing the program, function as: an obtaining unit configured to obtain a plurality of frames of image signals from a plurality of photoelectric conversion units, which receives light fluxes with different incident directions from an object; an information receiving unit configured to receive saturation information indicating whether the obtained image signals are saturated or not; a filter arithmetic unit configured to subject image signals of the plurality of frames to filter processing, thereby calculating the image signals subjected to filter processing; an evaluation value calculation unit configured to calculate a multivalued saturation evaluation value that indicates the reliability of the image signals subjected to the filter processing using the saturation information of the image signals of the frames most recently output; and a phase difference detection unit configured to determine whether or not to use the image signals subjected to the filter processing for phase difference detection based on the calculated saturation evaluation value.

According to the present invention, the degradation of the accuracy of phase difference detection can be suppressed.

Further features of the present invention will become apparent from the following description of exemplary embodiments (with reference to the attached drawings).

BRIEF DESCRIPTION OF THE DRAWINGS

FIG. 6A is a block diagram schematically showing the configuration of the filter arithmetic unit in the first embodiment of the present invention.

FIG. 6B is a block diagram schematically showing the configuration of the filter arithmetic unit in the first embodiment of the present invention.

DESCRIPTION OF THE EMBODIMENTS

Figure 1:
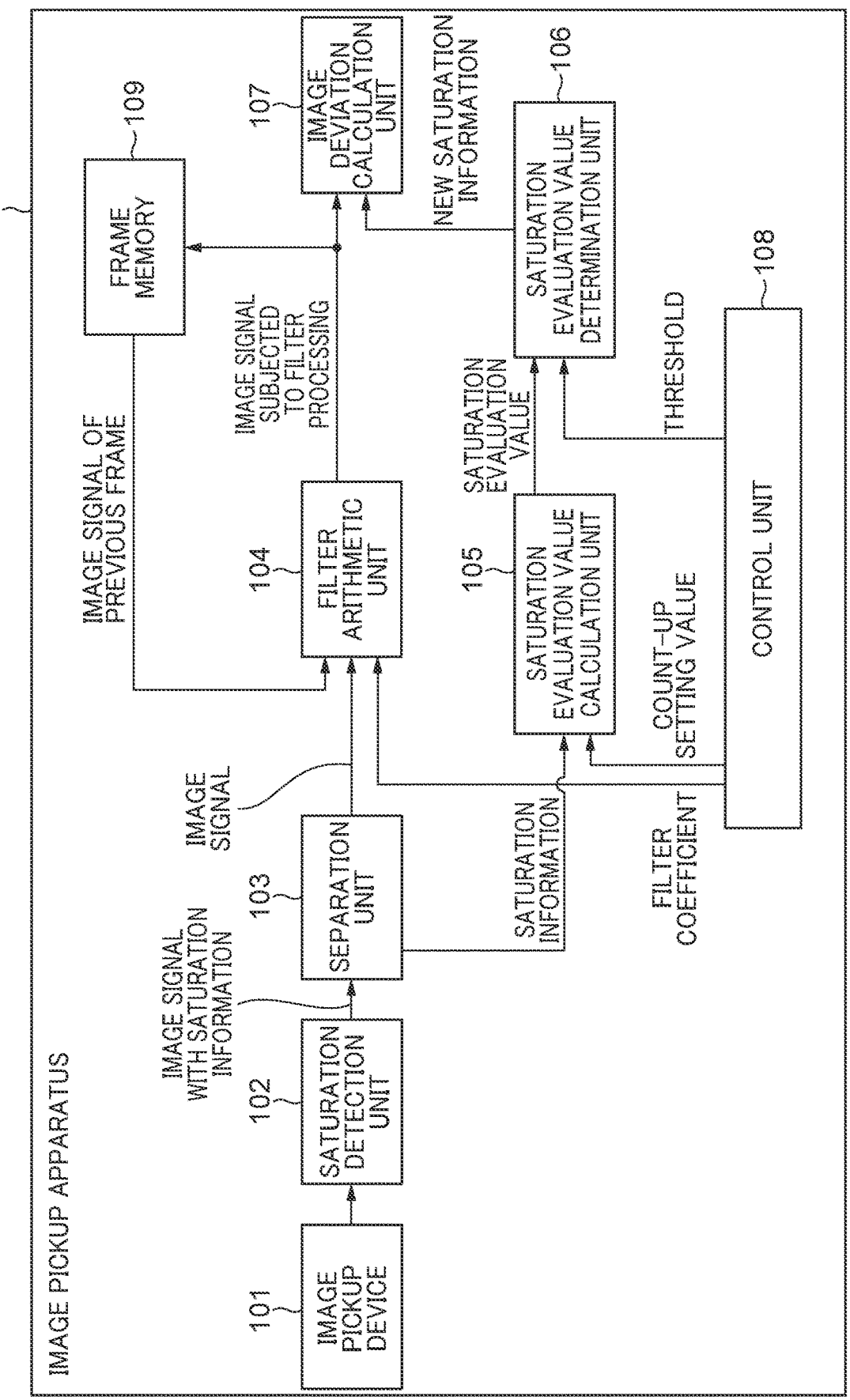
FIG. 1 is a block diagram schematically showing the configuration of the image pickup apparatus as a signal processing apparatus according to a first embodiment of the present invention.

The embodiments of the present invention are described below in detail with reference to the drawings. First, the first embodiment of the present invention will be described. FIG. 1 is a block diagram schematically showing the configuration of the image pickup apparatus as a signal processing apparatus. In the present embodiment, the saturation evaluation value of the image signals subjected to filter processing is calculated based on the saturation information of the image signals of a plurality of frames output by the same pixel of the image pickup device of the image pickup apparatus, and whether or not the image signals subjected to filter processing are used for phase difference detection is determined according to the saturation evaluation value. It should be noted that the saturation information and saturation evaluation value will be discussed later.

With reference to FIG. 1, an image pickup apparatus 100 includes an image pickup device 101, a saturation detection unit 102 (information generation unit), a separation unit 103, a filter arithmetic unit 104, and a saturation evaluation value calculation unit 105. The image pickup apparatus 100 further includes a saturation evaluation value determination unit 106, an image deviation calculation unit 107 (phase difference detection unit), a control unit 108, and a frame memory 109 (storage unit).

The image pickup device 101 includes a plurality of pixels, each of which has one microlens and a plurality of (for example, two) photoelectric conversion elements represented by photodiodes that convert the incident light passing through the microlens into electric charge. Each photoelectric conversion element receives light fluxes with different incident directions from the object (subject) and photoelectrically converts the received light fluxes to output image signals to the saturation detection unit 102.

Figure 2:
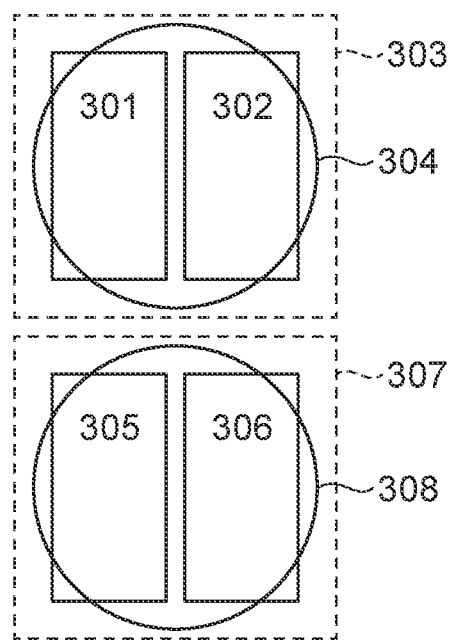
FIG. 2 shows the configuration of each pixel of the image pickup device included in the image pickup apparatus in FIG. 1.

FIG. 2 shows the configuration of each pixel of the image pickup device 101 included in the image pickup apparatus 100 in FIG. 1. FIG. 2 shows two pixels 303 and 307, but the image pickup device 101 has a large number of pixels having the same configuration as the pixels 303 and 307, and respective pixels are arranged horizontally and vertically. For example, the pixel 303 has one microlens 304 and two photoelectric conversion elements 301 and 302 (photoelectric conversion units). In the pixel 303, the microlens 304 is placed near the image surface of the optical system (not shown) of the image pickup apparatus 100, and the microlens 304 focuses light fluxes with different incident directions from the subject to each of the two photoelectric conversion elements 301 and 302. The two photoelectric conversion elements 301 and 302 output image signals of a plurality of frames along the time axis. The image signals acquired individually from the two photoelectric conversion elements 301 and 302 are used for phase difference detection, and the image signals acquired simultaneously are used for creating the recorded image. The pixel 307 has one microlens 308 and two photoelectric conversion elements 305 and 306. In the pixel 307, a microlens 308 is placed near the image surface of the optical system (not shown) of the image pickup apparatus 100, and the microlens 308 focuses light fluxes with different incident directions from the subject to each of the two photoelectric conversion elements 305 and 306. Similar to the two photoelectric conversion elements 301 and 302, the two photoelectric conversion elements 305 and 306 output image signals of a plurality of frames along the time axis. At this time, image signals acquired individually from the two photoelectric conversion elements 305 and 306 are used for phase difference detection, and the image signals acquired at the same time are used for creating a recorded image.

Returning to FIG. 1, the saturation detection unit 102 detects whether the image signals of the respective frames acquired from each pixel of the image pickup device 101 are saturated or not, and generates saturation information indicating whether the image signals are saturated or not. The saturation detection unit 102 sequentially outputs the image signals of the respective frames and the corresponding saturation information to the separation unit 103. The separation unit 103 separates the image signals of the respective frames and the corresponding saturation information output by the saturation detection unit 102, outputs the image signals to the filter arithmetic unit 104, and outputs the saturation information to the saturation evaluation value calculation unit 105.

The filter arithmetic unit 104 executes filter processing using the image signals output from the separation unit 103 and the image signals output from the frame memory 109, and outputs the image signals subjected to filter processing to the image deviation calculation unit 107 and the frame memory 109. The frame memory 109 holds the image signals of a plurality of frames output prior to the image signals of the frames most recently output by a certain pixel in the image pickup device 101. The frame memory 109 outputs the image signals of these frames to the filter arithmetic unit 104 during filter processing. It should be noted that the details of the content of the filter processing in the present embodiment are described below.

The saturation evaluation value calculation unit 105 calculates the saturation evaluation value using the saturation information output from the separation unit 103 and the count-up setting value set by the control unit 108, and outputs the calculated saturation evaluation value to the saturation evaluation value determination unit 106. In addition, the saturation evaluation value calculation unit 105 holds the calculated saturation evaluation value. The calculated saturation evaluation value may be held by the frame memory 109 instead of the saturation evaluation value calculation unit 105. It should be noted that the details of the calculation of the saturation evaluation value in the present embodiment will be described later. Based on the saturation evaluation value output from the saturation evaluation value calculation unit 105 and the threshold described below set by the control unit 108, the saturation evaluation value determination unit 106 determines the contribution ratio of the saturated image signals of the frames in the image signals subjected to filter processing, and generates new saturation information. In addition, the saturation evaluation value determination unit 106 outputs the new saturation information to the image deviation calculation unit 107.

The image deviation calculation unit 107 calculates the amount of image deviation in the image signals based on the image signals subjected to filter processing and the new saturation information, and executes phase difference detection. The control unit 108 controls the entire image pickup apparatus 100. In the present embodiment, the control unit 108 sets the filter coefficients used in the filter processing and the count-up setting value used in the calculation of the saturation evaluation value, and sets the threshold used in the generation of new saturation information.

The frame memory 109 holds the image signals subjected to filter processing output from the filter arithmetic unit 104. The frame memory 109 also holds the image signals of a plurality of frames output prior to the image signals of frames most recently output by a certain pixel of the image pickup device 101, as described above. Furthermore, when filter processing is executed, the frame memory 109 outputs the image signals of these previous frames to the filter arithmetic unit 104. In the present embodiment, hereinafter, the image signals of the frames most recently output by a certain pixel of the image pickup device 101 are referred to as the "image signals of the focused frames", and the image signals of the frames output prior to the image signals of the frames most recently output by the above certain pixel are referred to as the "image signals of the previous frames".

Figure 3:
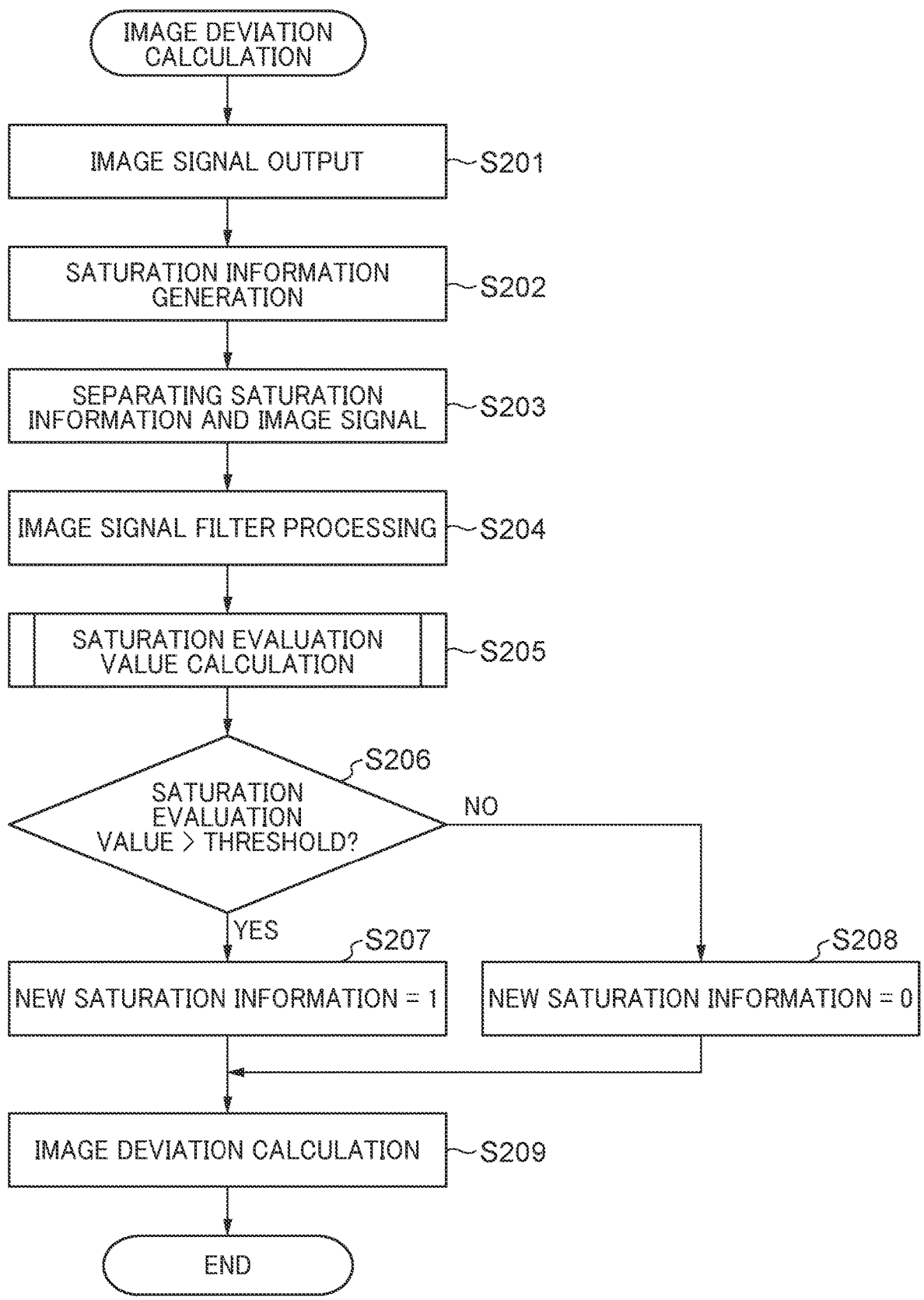
FIG. 3 is a flowchart showing the image deviation calculation processing as a signal processing method according to the first embodiment of the present invention.

FIG. 3 is a flowchart showing the image deviation calculation processing as a signal processing method according to the first embodiment of the present invention. This processing is mainly executed when autofocus operation is executed in the image pickup apparatus 100. For example, when the image pickup apparatus 100 is a digital camera, this processing is initiated in response to the pressing of the release button. This processing is realized by the control unit 108 executing the control program and controlling the various parts of the signal processing apparatus. In the present embodiment, every time image signals of the focused frames are output from a certain pixel in the image pickup device 101, filter processing is executed using the image signals of the focused frames and the image signals of a plurality of previous frames, and phase difference detection is executed using the image signals subjected to the filter processing. This processing corresponds to this phase difference detection, and is repeated every time the image signals of the focused frames are output.

With reference to FIG. 3, first, the image pickup device 101 outputs the image signals of the focused frames to the saturation detection unit 102 (step S201). The saturation detection unit 102 detects whether the image signals of the focused frames are saturated or not, and generates saturation information (step S202). Specifically, when the signal level of the image signals of the focused frames is less than or equal to a predetermined value, the image signals of the focused frames are considered to be saturated, and saturation information is generated as information that can identify the saturation. The saturation detection unit 102 sets "1" to the saturation information when the image signals of the focused frames are considered to be saturated, and sets "0" to the saturation information when the image signals of the focused frames are not considered to be saturated. The saturation detection unit 102 then attaches saturation information to the image signals of the focused frames and outputs them as image signals with saturation information to the separation unit 103.

Figure 4:
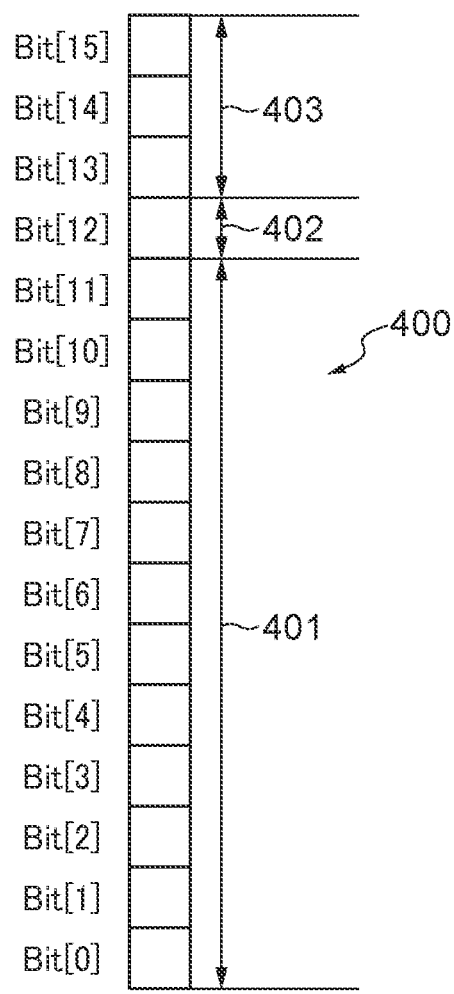
FIG. 4 shows the format of an image signal with saturation information output by the saturation detection unit.

FIG. 4 shows the format of the image signals with saturation information output by the saturation detection unit 102. FIG. 4 schematically shows the format of image signals for one pixel. In the present embodiment, the image signals output by each pixel are output as digital data where the image signals per pixel are represented by a predetermined number of bits of data for easy handling. For example, as shown in FIG. 4, when the digital data 400, which is an image signal for one pixel, consists of 16 bits of data, the digitized signal value of the image signals for one pixel is stored in a bit string 401 of 12 bits in total. The saturation information is stored in one bit 402 adjacent to the bit string 401. In addition, a total of three bit strings 403 adjacent to the bit 402 store the saturation evaluation value generated by the saturation evaluation value calculation unit 105. Instead of being stored in the digital data 400, the saturation evaluation value may be stored in a counter frame memory (not shown) of the saturation evaluation value calculation unit 105.

In the present embodiment, the bit precision of the saturation evaluation value is set to 3 bits, but the bit precision of the saturation evaluation value may be changed according to the filter coefficients used in the filter arithmetic unit 104. For example, when the response of the filter is slow, more frames need to be counted than when the response of the filter is fast. Therefore, when the response of the filter is slow, the threshold of the saturation evaluation value is increased by increasing the bit precision of the saturation evaluation value. For example, when the bit precision is 3 bits, the threshold of the saturation evaluation value is 7, and when the bit precision is 4 bits, the threshold of the saturation evaluation value is 15. When the threshold of the saturation evaluation value remains unchanged at 1, and the bit precision is 3 bits, then the saturation evaluation value changes in increments of 0.125. When the bit precision is 4 bits, then the saturation evaluation value varies in increments of 0.0625. This slows down the degree of increase of the saturation evaluation value with respect to the threshold, so by increasing the bit precision, the behavior of the saturation evaluation value will approximate that in the case where the filter response is slow.

Returning to FIG. 3, the separation unit 103 separates the saturation information from the image signals with saturation information output by the saturation detection unit 102 and outputs the separated saturation information to the saturation evaluation value calculation unit 105 (step S203). In addition, only the signal value is separated from the image signals with saturation information as image signals and output to the filter arithmetic unit 104. Specifically, the bit string 401 and bit 402 are separated from the digital data 400, and the former is output as the image signals of the focused frames, i.e., the image signals on a per-pixel basis. The latter is output as the saturation information of the image signals of the focused frames, i.e., the saturation information on a per-pixel basis. That is, since the information can be handled on a per-pixel basis, the image signals and saturation information can be separated while maintaining the position information in the image pickup device 101 of the pixel that outputs the image signals of the focused frames. Hereinafter, it should be noted that the saturation information of the image signals of the focused frames is referred to as the "saturation information of the focused frames."

Next, the filter arithmetic unit 104 executes filter processing using the separated image signals (step S204). This filter processing is a digital filter processing of image signals of a plurality of frames along the time axis, specifically, it is a moving average processing of image signals of a plurality of frames along the time axis. The filter arithmetic unit 104 outputs the image signals subjected to filter processing to the frame memory 109 and image deviation calculation unit 107.

Figure 5:
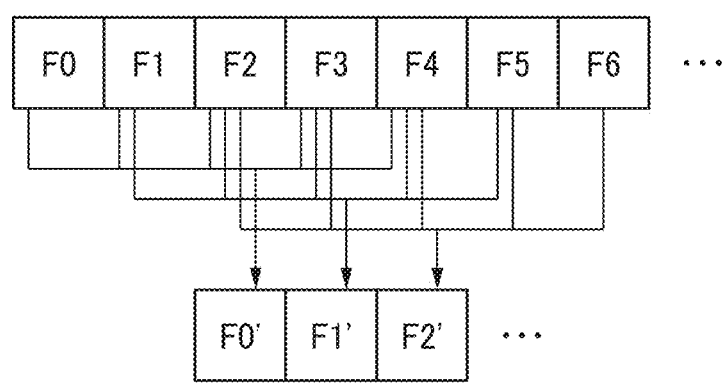
FIG. 5 shows the moving average processing executed by the filter arithmetic unit.

FIG. 5 shows the moving average processing executed by the filter arithmetic unit 104. With reference to FIG. 5, image signals F0 to F6 are the image signals of seven consecutive frames along the time axis, output from a certain pixel of the image pickup device 101. The image signal F0' subjected to filter processing is a moving average filter output with five taps (number of frames used for filter processing), obtained by applying moving average processing to the image signals F0 to F4 of five consecutive frames along the time axis. The image signal F1' subjected to filter processing is the moving average filter output with five taps, obtained by applying moving average processing to the image signals F1 to F5 of five consecutive frames along the time axis. The image signal F2' subjected to filter processing is the moving average filter output with five taps, which is obtained by applying moving average processing to the image signals F2 to F6 of five consecutive frames along the time axis. Each moving average filter output corresponds to an image signal subjected to filter processing. Each time this processing is executed once, one image signal subjected to filter processing is calculated. These image signals F0' to F2' subjected to filter processing are calculated using the filter coefficients set by the control unit 108. It should be noted that the filter processing executed by the filter arithmetic unit 104 is not limited to moving average processing. For example, it may be an addition and subtraction processing in which an additive average is applied to the image signals of five consecutive frames along the time axis.

FIGS. 6A and 6B are block diagrams schematically showing the configuration of the filter arithmetic unit 104 in the present embodiment. FIG. 6A shows the case where a finite impulse response (FIR) filter configuration is applied to the filter arithmetic unit 104. FIG. 6B shows the case where an infinite impulse response (IIR) filter configuration is applied to the filter arithmetic unit 104.

In the FIR filter of FIG. 6A, the image signals of the focused frames output from the separation unit 103 are input into an input terminal. The FIR filter also has frame memories 601a to 601d, which hold the image signals of the previous frames output by the frame memory 109, respectively. Then, in the FIR filter, the image signals of the five frames, which are the image signals of the focused frames and the image signals of the previous frame held by each of the frame memories 601a to 601d, are multiplied by filter coefficients coef0 to coef4, respectively. An adder 602 synthesizes the image signals to which the filter coefficients coef0 to coef4 have been multiplied, and a normalization processing part 603 normalizes the synthesized image signals to calculate the image signals subjected to filter processing. For example, when calculating the image signal F0' subjected to filter processing, the image signal F4 is input from the separation unit 103 through the input terminal. Then, the filter coefficients coef0 to coef4 are multiplied to the image signals of the five frames, which are the input image signal F4 and the image signals F3 to F0 held by the frame memories 601a to 601d, respectively. Then, the adder 602 synthesizes the image signals F4 to F0 to which the filter coefficients coef0 to coef4 have been multiplied. The normalization processing part 603 normalizes the synthesized image signals F4 to F0 to calculate the image signal F0' subjected to filter processing. In the FIR filter, it should be noted that the number of taps (the number of frames of the image signals used) is fixed, and it is assumed as 5 in FIG. 6A.

In the IIR filter of FIG. 6B, the image signals of the focused frames output from the separation unit 103 are also input into the input terminal. The IIR filter also has one frame memory 601e that holds the image signals subjected to filter processing calculated from the image signals of the previous frames (hereinafter referred to as "image signals subjected to previous filter processing"). In the IIR filter, the image signals subjected to filter processing are calculated by Equation 1 below using the image signals of the focused frames and the image signals subjected to previous filter processing held by the frame memory 601e.

Image signals subjected to filter processing=$A$*coef+ $B$*(1−coef) \hfill (1)

A represents the image signals of the focused frames, and B represents the image signals subjected to previous filter processing. After the calculation of the image signals subjected to filter processing, the image signals subjected to previous filter processing held by the frame memory 601e are replaced by the calculated image signals subjected to filter processing.

The IIR filter in FIG. 6B requires less frame memories than the FIR filter in FIG. 6A, thus reducing the cost. In addition, the IIR filter is suitable in terms of obtaining stable image signals subjected to filter processing because the response characteristics are continued indefinitely and the filter coefficients coef are constant, thus excluding unwanted influences. In the present embodiment, it should be noted that the IIR filter in FIG. 6B will be used as the premise for the explanation.

Returning to FIG. 3, the saturation evaluation value calculation unit 105 calculates the saturation evaluation value using the saturation evaluation value already held by itself, the saturation information output from the separation unit 103, and the count-up setting value (count value) set by the control unit 108 (step S205). In the following, the saturation evaluation value already held by the saturation evaluation value calculation unit 105 itself is referred to as the "previous saturation evaluation value".

Figure 7:
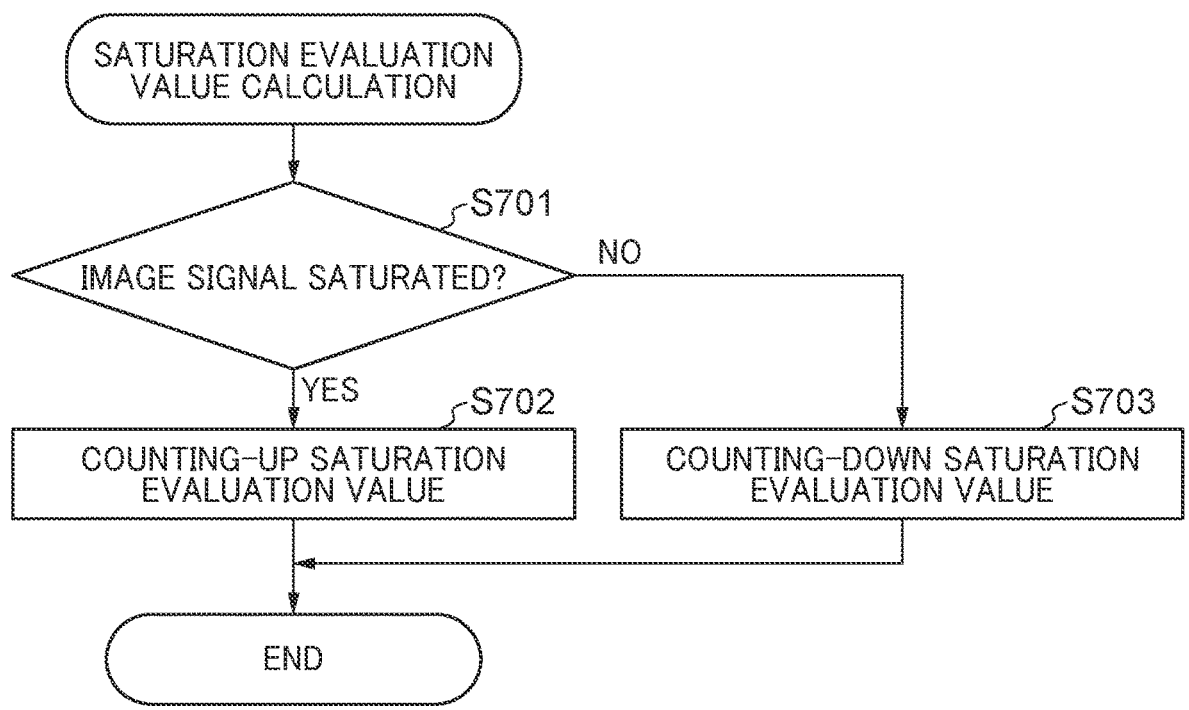
FIG. 7 is a flowchart showing the saturation evaluation value calculation processing in a step S205 in FIG. 3.

FIG. 7 is the flowchart showing the saturation evaluation value calculation processing in the step S205 of FIG. 3. With reference to FIG. 7, the saturation evaluation value calculation unit 105 determines whether the image signals of the focused frames are saturated or not based on the saturation information of the focused frames output from the separation unit 103 (step S701). Specifically, when the saturation information is "1", the image signals of the focused frames are determined to be saturated, and the processing proceeds to a step S702. When the saturation information is "0", the image signals of the focused frames are determined to be not saturated, and the processing proceeds to a step S703.

In the step S702, a new saturation evaluation value is calculated by counting up through adding the count-up setting value to the previous saturation evaluation value. In the step S703, a new saturation evaluation value is calculated by subtracting (counting down) the count-up setting value from the previous saturation evaluation value. Here, the previous saturation evaluation value is the saturation evaluation value of the image signals subjected to filter processing, which is calculated using the image signals of the previous frames, obtained when the step S205 of one previous image deviation calculation processing (the processing in FIG. 3) is executed. For example, when the image signal F1' subjected to filter processing is calculated by the present processing in FIG. 3, the previous saturation evaluation value is the saturation evaluation value of the image signal F0' subjected to filter processing calculated using the image signals F0 to F4 of the frames. The new saturation evaluation value is the saturation evaluation value of the image signal F1' subjected to filter processing, which is calculated using the image signals F1 to F5 of the frames.

Therefore, a large saturation evaluation value indicates that there are many saturated image signals in the image signals of the respective frames used to calculate the image signals subjected to filter processing. A small saturation evaluation value indicates that there are few saturated image signals in the image signals of the respective frames used to calculate the image signals subjected to filter processing. In other words, when the saturation evaluation value of the image signals subjected to filter processing is large, the reliability of the image signals subjected to filter processing is low, and when the saturation evaluation value of the image signals subjected to filter processing is small, the reliability of the image signals subjected to filter processing is high.

When the number of image signals of the previous frames used to calculate the image signals subjected to filter processing is small, the count-up setting value may be increased. For example, normally, image signals from five frames are used to calculate the image signals subjected to filter processing, but when the release button has just been pressed and there is only one image signal from the previous frame, the count-up setting value may be increased. In this case, when the image signal of the focused frame is saturated, the saturation evaluation value suddenly becomes large even though only two image signals (the image signal of the previous frame and the image signal from the focused frame) are used to calculate the image signals subjected to filter processing. As a result, the reliability of the image signal subjected to such filter processing is found to be low, and thus the image signal subjected to filter processing that has been greatly affected by, for example, steep saturation such as flash light that occurs only in the first frame of shooting, can be eliminated from phase difference detection.

Thereafter, the saturation evaluation value calculation unit 105 outputs the calculated new saturation evaluation value to the saturation evaluation value determination unit 106 and holds the calculated saturation evaluation value as the previous saturation evaluation value to be used in the next image deviation calculation processing.

Figure 8:
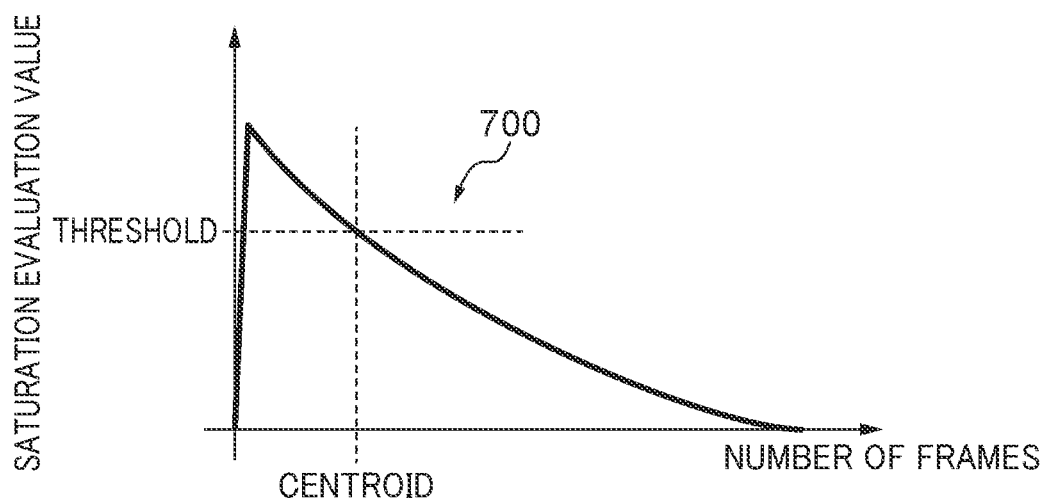
FIG. 8 is a graph of phase characteristics showing the influence of the image signals of the focused frames on the image signals subjected to filter processing when the IIR filter configuration is applied to the filter arithmetic unit.

Returning to FIG. 3, the saturation evaluation value determination unit 106 determines whether the new saturation evaluation value output from the saturation evaluation value calculation unit 105 is greater than the threshold (predetermined threshold) output from the control unit 108 (step S206). FIG. 8 is a graph of phase characteristics 700 showing the influence of the image signals of the focused frames on the image signals subjected to filter processing when the IIR filter configuration is applied to the filter arithmetic unit 104. The influence of the image signals of the focused frames on the image signals subjected to filter processing is, in other words, the contribution ratio of the image signals of the focused frames to the image signals subjected to filter processing. In this graph, the horizontal axis indicates the number of frames of the image signals used for filter processing, and the vertical axis indicates the saturation evaluation value as the contribution ratio of the image signals of the focused frames to the image signals subjected to filter processing. As the phase characteristics 700 shows, the more frames of the image signals used in the filter processing, the smaller the influence of the image signals of the focused frames on the image signals subjected to the filter processing. In the present embodiment, it is assumed that when the number of frames of the image signals used for filter processing becomes larger than the number of frames at the centroid of the phase characteristics 700, the influence of the image signals of the focused frames on the image signals subjected to filter processing becomes smaller. Therefore, the saturation evaluation value corresponding to the number of frames at the centroid of the phase characteristics 700 is set as a threshold as described above.

When the new saturation evaluation value is determined to be greater than the threshold in step S206, "1" is set as the new saturation information for the image signals subjected to filter processing (step S207). When the new saturation evaluation value is determined to be less than or equal to the threshold, "0" is set as the new saturation information for the image signals subjected to filter processing (step S208). When "1" is set as the new saturation information, it indicates that the saturated image signals of the focused frames have a great influence on the image signals subjected to filter processing, and the reliability of the image signals subjected to filter processing is low. When "0" is set as the new saturation information, it indicates that the influence of the saturated image signals of the focused frames on the image signals subjected to filter processing is small, and the reliability of the image signals subjected to filter processing is high. Then, the saturation evaluation value determination unit 106 outputs the new saturation information to the image deviation calculation unit 107. It should be noted that the image deviation calculation unit 107 may directly obtain the new saturation evaluation value from the saturation evaluation value calculation unit 105 and determine whether the new saturation evaluation value is greater than the threshold. In this case, the saturation evaluation value determination unit 106 is no longer needed, and there is no need to hold new saturation information in the frame memory 109, thus reducing the capacity of the frame memory 109.

Next, the image deviation calculation unit 107 calculates the image deviation of the image signal based on the image signals subjected to filter processing output from the filter arithmetic unit 104 and the new saturation information output from the saturation evaluation value determination unit 106 to execute phase difference detection (step S209).

Specifically, when the new saturation information is "0", the image signals subjected to filter processing output from the filter arithmetic unit 104 are used to calculate the amount of image deviation of the image signal. On the other hand, when the new saturation information is "1", the image signals subjected to filter processing output from the filter arithmetic unit 104 are not used for calculating the amount of image deviation of the image signal.

By the way, as described above, since the image signal output by each pixel includes two image signals output by two photoelectric conversion elements that receive light fluxes with different incident directions from the subject, the image signals subjected to filter processing also include two image signals corresponding to light fluxes with different incident directions. In the step S209, the correlation calculation of these two image signals is executed, and the amount of image deviation is calculated from the result of the correlation calculation. When the new saturation information is "0", the correlation operation of the two image signals is executed, and when the new saturation information is "1", the correlation operation of the two image signals is not executed. Then, this processing is terminated.

According to the present embodiment, based on a new saturation evaluation value that indicates the reliability of the image signals subjected to filter processing, it is determined whether or not to use the image signals subjected to the filter processing for phase difference detection. The new saturation evaluation value is calculated using not only the saturation information of the focused frames, but also the saturation evaluation value of the image signals subjected to filter processing, which is calculated using the image signals of the frames output prior to the focused frames. Furthermore, the saturation evaluation value is not a binary value represented by 0 or 1, but is obtained by counting up or down the count-up setting value for each image signal of a plurality of frames to obtain three or more multivalued values. That is, the saturation evaluation value does not simply indicate whether or not the image signal of even one frame of the frames of image signals to be subjected to filter processing is saturated, but rather indicates the percentage of saturated pixels in the plurality of frames. Therefore, even if the image signals of the focused frames are saturated, the situation where the image signals subjected to filter processing calculated using the image signals of the focused frames is not immediately used for phase difference detection can be avoided. This prevents the number of image signals subjected to filter processing used for phase difference detection from decreasing, and thus prevents the accuracy of phase difference detection from decreasing.

In the present embodiment, the threshold of the saturation evaluation value used for determining whether the image signals subjected to filter processing are to be used for phase difference detection is set based on the phase characteristics 700, which indicates the contribution ratio of the image signals of the focused frames to the image signals subjected to filter processing. As a result, even if the image signals of the focused frames are saturated, when the contribution ratio of the image signals of the focused frames is small, the image signals subjected to filter processing can be used for phase difference detection. When the image signals of the focused frames are saturated and the contribution ratio of the image signals of the focused frames is large, the image signals subjected to filter processing are not used for phase difference detection. In other words, it is possible to appropriately determine whether or not to use the image signals subjected to filter processing for phase difference detection, while taking into account the influence of the image signals of the focused frames on the image signals subjected to filter processing.

Next, the second embodiment of the present invention is described. The second embodiment is basically the same as the first embodiment described above in its configuration and function, and differs from the first embodiment in that the saturation evaluation value is calculated by filter processing. Therefore, description of duplicated configurations and actions are omitted, and description of different configurations and actions are given below.

Figure 9:
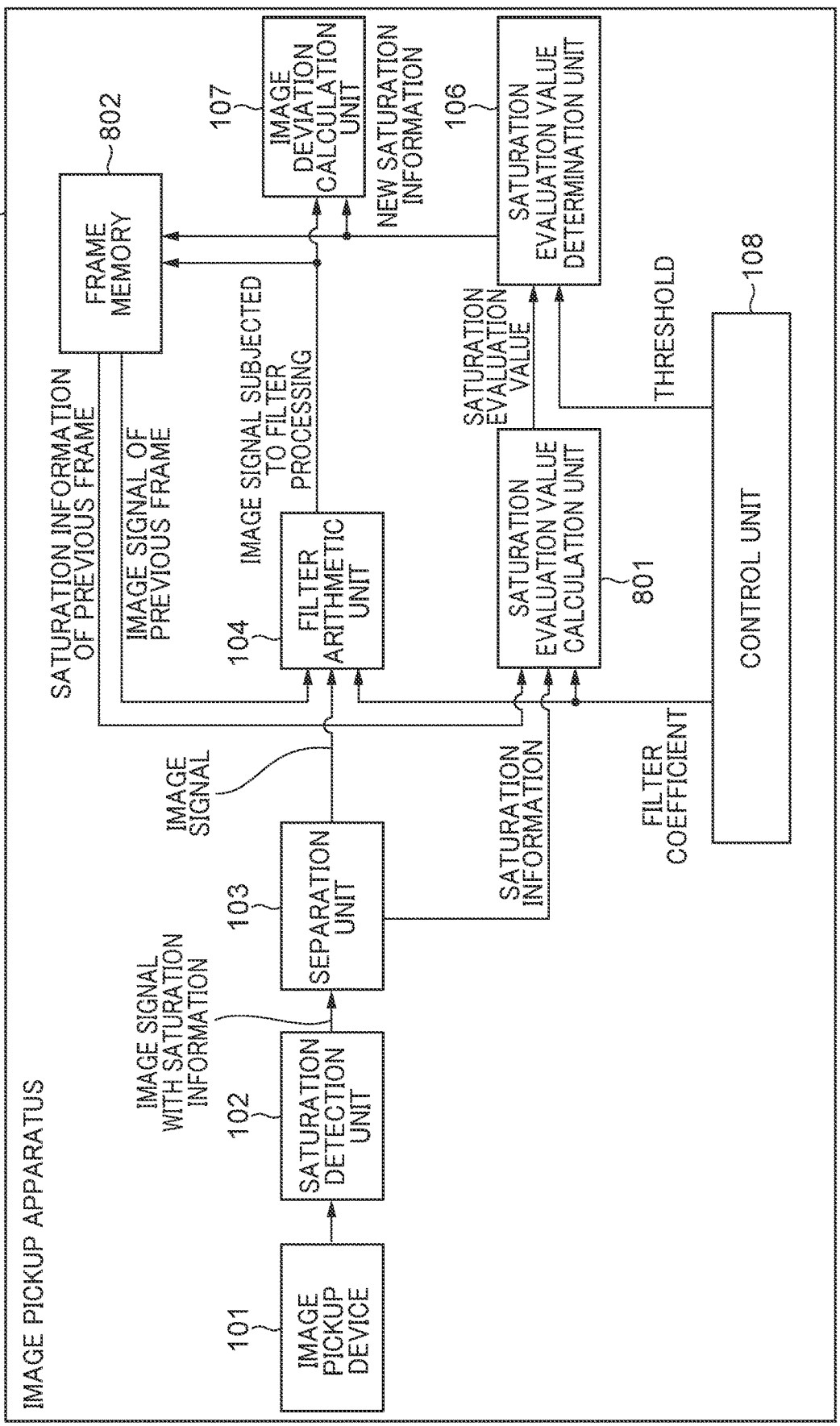
FIG. 9 is a block diagram schematically showing the configuration of the image pickup apparatus as a signal processing apparatus according to a second embodiment of the present invention.

FIG. 9 is a block diagram schematically showing the configuration of an image pickup apparatus 800 as a signal processing apparatus according to the second embodiment of the present invention. With reference to FIG. 9, a frame memory 802 holds the image signals subjected to filter processing output from a filter arithmetic unit 104 and the new saturation information output from a saturation evaluation value determination unit 106. The frame memory 802 also holds a plurality of image signals of the previous frames and pieces of the saturation information of the image signals of the previous frames (hereinafter referred to as the saturation information of the previous frames). For example, it holds the image signals of the previous frames and pieces of the saturation information of the previous frames in an amount of the number of taps of the moving average processing minus one. When filter processing is executed, the frame memory 802 outputs the image signals of the previous frames it holds to the filter arithmetic unit 104, and also outputs the pieces of the saturation information of the previous frames it holds to a saturation evaluation value calculation unit 801.

The saturation evaluation value calculation unit 801 calculates the saturation evaluation value based on the saturation information of the focused frames output from a separation unit 103, the saturation information of a plurality of previous frames output from the frame memory 802, and the filter coefficients set by the control unit 108. The saturation evaluation value calculation unit 801 outputs the calculated saturation evaluation value to the saturation evaluation value determination unit 106. The saturation evaluation value calculation unit 801 has an FIR filter configuration and applies moving average processing as filter processing to the saturation information of the focused frames output from the separation unit 103 and the saturation information of a plurality of previous frames output from the frame memory 802. It should be noted that in the second embodiment, the filter arithmetic unit 104 also has an FIR filter configuration.

Figure 10:
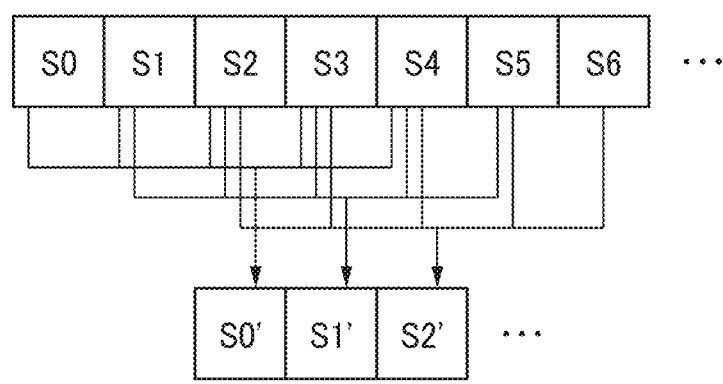
FIG. 10 shows the moving average processing executed by this saturation evaluation value calculation unit.

FIG. 10 shows the moving average processing executed by the saturation evaluation value calculation unit 801. With reference to FIG. 10, saturation information S0 to S6 is the saturation information of the image signals of seven consecutive frames along the time axis, which are output from one pixel of the image pickup device 101. The saturation evaluation value S0' is the moving average filter output with five taps (number of frames used for filter processing), which is obtained by applying moving average processing to the saturation information S0 to S4 of five consecutive frames along the time axis. The saturation evaluation value S1' is the moving average filter output with five taps, which is obtained by applying moving average processing to the saturation information S1 to S5 of five consecutive frames along the time axis. The saturation evaluation value S2' is the moving average filter output with five taps, which is obtained by applying moving average processing to the saturation information S2 to S6 of five consecutive frames along the time axis. Each moving average filter output corresponds to a saturation evaluation value. These saturation evaluation values S0' to S2' are calculated using filter coefficients set by the control unit 108.

Therefore, when many image signals are saturated (saturation information is "1" instead of "0") in the image signals of the respective frames, the saturation evaluation value calculated through the moving average processing will be larger. That is, a large saturation evaluation value indicates that many image signals are saturated in the image signals of the respective frames used to calculate the image signals subjected to filter processing. In other words, when the saturation evaluation value is large, it indicates that the image signals subjected to filter processing is unreliable, as in the first embodiment. It should be noted that the filter processing executed by the saturation evaluation value calculation unit 801 is not limited to moving average processing, but may be, for example, an addition and subtraction processing in which an additive average is applied to the saturation information of five consecutive frames along the time axis.

After the saturation evaluation value is calculated by the moving average process, the processing in the saturation evaluation value determination unit 106 and the image deviation calculation unit 107 is the same as the processing in the first embodiment.

In the present embodiment, as in the first embodiment, whether or not to use the image signal subjected to the filter processing for phase difference detection is determined based on the saturation evaluation value, which indicates the reliability of the image signal subjected to the filter processing. This prevents the number of image signals subjected to filter processing used for phase difference detection from decreasing, and thus prevents the accuracy of phase difference detection from decreasing.

In the present embodiment, the saturation evaluation value is calculated through moving average processing (filter processing) of the saturation information of the respective frames. Therefore, even if the image signals of the focused frames are saturated and the saturation information is "1", the saturation evaluation value is not necessarily larger than the threshold. That is, it is possible to determine whether or not to use the image signals subjected to filter processing for phase difference detection by taking into account the contribution ratio of the saturation information of the focused frames to the saturation evaluation value.

In the present embodiment, the saturation evaluation value is calculated by similar processing to the moving average processing executed by the filter arithmetic unit 104, the phase characteristics of the image signals subjected to filter processing and the saturation evaluation value can be matched.

Next, the third embodiment of the present invention is described. In the third embodiment, as in the second embodiment, the saturation evaluation value is calculated by filter processing, but it differs from the second embodiment in that the saturation evaluation value calculation unit has an IIR filter configuration. Therefore, description of duplicated configurations and actions are omitted, and description of different configurations and actions are given below.

Figure 11:
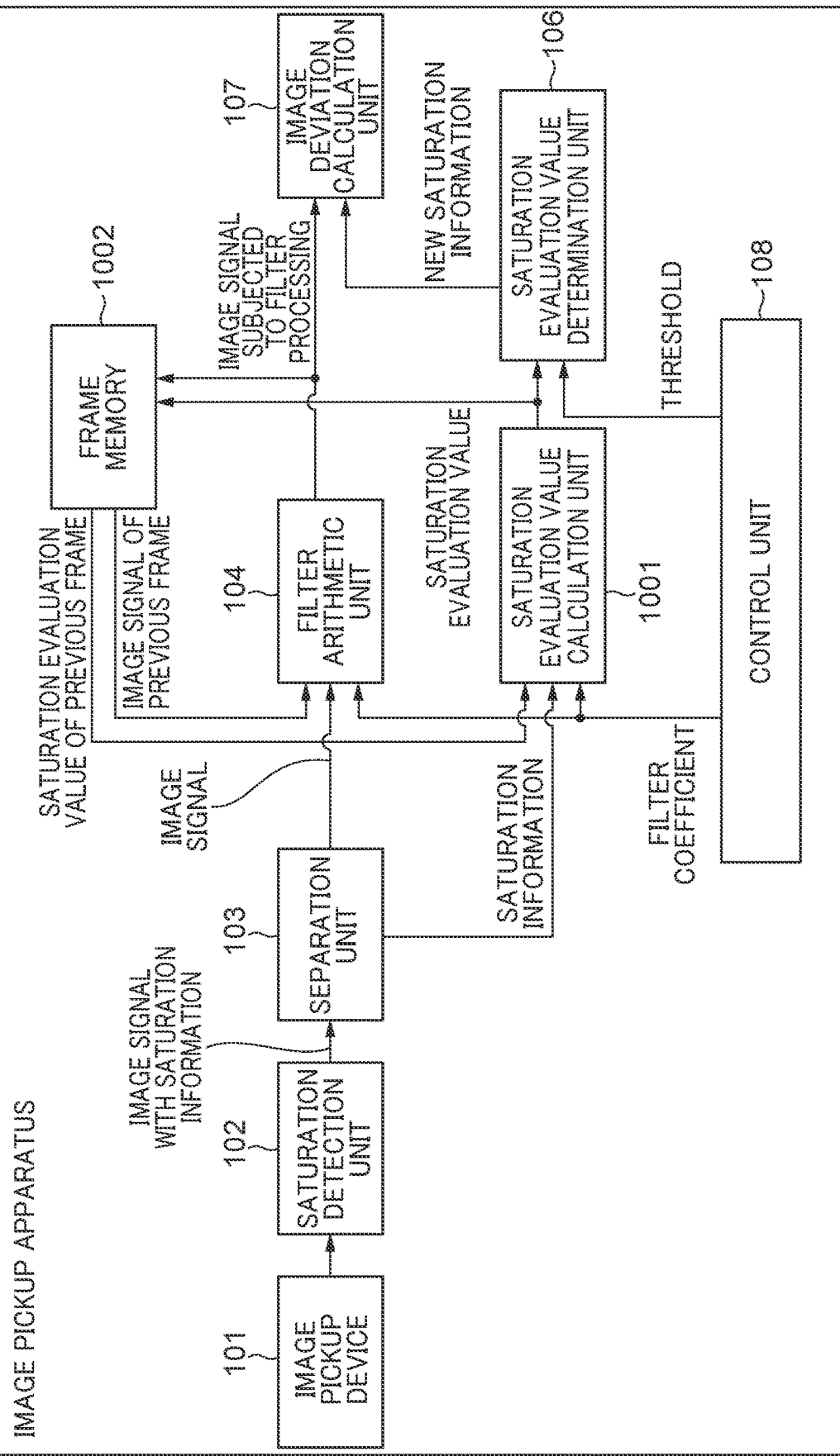
FIG. 11 is a block diagram schematically showing the configuration of the image pickup apparatus as a signal processing apparatus according to a third embodiment of the present invention.

FIG. 11 is a block diagram schematically showing the configuration of an image pickup apparatus 1000 as a signal processing apparatus according to the third embodiment of the present invention. With reference to FIG. 11, a frame memory 1002 holds the image signals subjected to filter processing output from the filter arithmetic unit 104 and the saturation evaluation value output from a saturation evaluation value calculation unit 1001. The frame memory 1002 also holds the image signals of a plurality of previous frames. When filter processing is executed, the frame memory 1002 outputs the image signals of the previous frames it holds to the filter arithmetic unit 104, and also outputs the saturation evaluation values it holds to the saturation evaluation value calculation unit 1001.

The saturation evaluation value calculation unit 1001 calculates the saturation evaluation value based on the saturation information of the focused frames output from the separation unit 103, the previous saturation evaluation value, and the filter coefficients set by the control unit 108. In addition, the saturation evaluation value calculation unit 1001 outputs the calculated saturation evaluation value to a saturation evaluation value determination unit 106. Here, the previous saturation evaluation value is the saturation evaluation value calculated by the filter processing using the saturation information of the frames before the focused frames. The saturation evaluation value calculation unit 1001 has the same configuration as the IIR filter illustrated in FIG. 6B, and has one frame memory. The one frame memory holds the previous saturation evaluation value. It should be noted that in the third embodiment, the filter arithmetic unit 104 also has an IIR filter configuration.

In the saturation evaluation value calculation unit 1001, a new multivalued saturation evaluation value is calculated according to Equation 1 above. In this case, it should be noted that the calculation result of Equation 1 is the new saturation evaluation value, A in Equation 1 is the saturation information of the focused frames, and B is the previous saturation evaluation value. After the new saturation evaluation value is calculated, the previous saturation evaluation value held by the frame memory is replaced by the new saturation evaluation value.

After the new saturation evaluation value is calculated, the processing in the saturation evaluation value determination unit 106 and the image deviation calculation unit 107 is the same as the processing in the first embodiment.

Figure 12A:
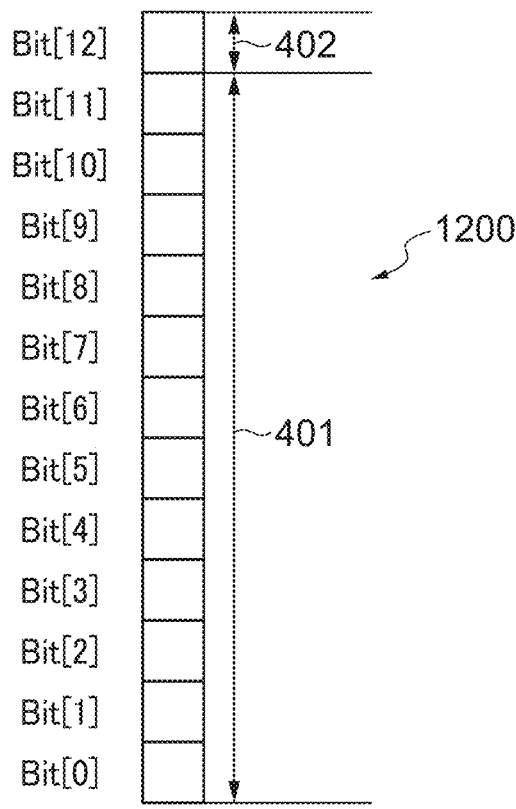
FIG. 12A shows the format for a single pixel held by a frame memory.
Figure 12B:
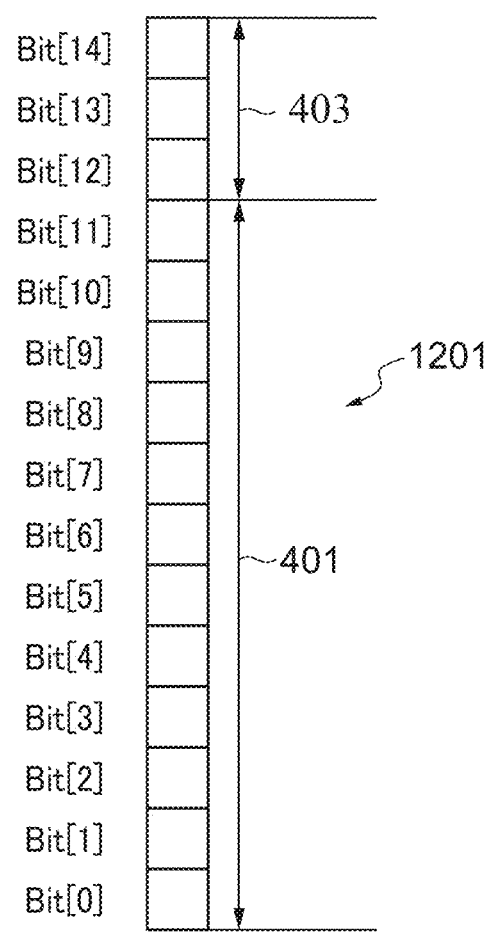
FIG. 12B shows the format for a single pixel held by a frame memory.

FIGS. 12A and 12B illustrate the format for one pixel held by the frame memory. FIG. 12A shows a format 1200 for one pixel in the second embodiment, and FIG. 12B shows a format 1201 for one pixel in the third embodiment.

In the second embodiment, the filter arithmetic unit 104 and the saturation evaluation value calculation unit 801 have the FIR filter configuration. Since only the saturation information is used in the calculation of the saturation evaluation value, the format 1200 for one pixel only needs to have a bit string 401 to store the digitized signal value of the image signal and one bit 402 to store the saturation information, which is either "0" or "1". This allows the amount of data per pixel to be reduced. On the other hand, in the third embodiment, the filter arithmetic unit 104 and the saturation evaluation value calculation unit 1001 have an IIR filter configuration. And since the saturation evaluation value is calculated by filter processing, it can be multi-bit data with fractional components. Correspondingly, in the third embodiment, a format 1201 for one pixel has a plurality of bits, e.g., three bit strings 403 for storing the saturation evaluation value instead of one bit 402 for storing the saturation information. Therefore, the amount of data per pixel is less in the second embodiment than in the third embodiment.

However, the FIR filter requires a plurality of frame memories, the number of which being the number of taps minus one, while the IIR filter only needs one frame memory. As a result, the third embodiment can be realized at a lower cost than the second embodiment.

In the third embodiment, it should be noted that when many image signals are saturated in the image signals of the respective frames (saturation information is "1" instead of "0"), the new saturation evaluation value will be larger. Therefore, when the saturation evaluation value is large, it indicates that the reliability of the image signals subjected to filter processing is low, as in the first embodiment.

The preferred embodiments of the present invention have been described above, but the present invention is not limited to the above-described embodiments, and various variations and changes are possible within the scope of the gist thereof.

Figure 13:
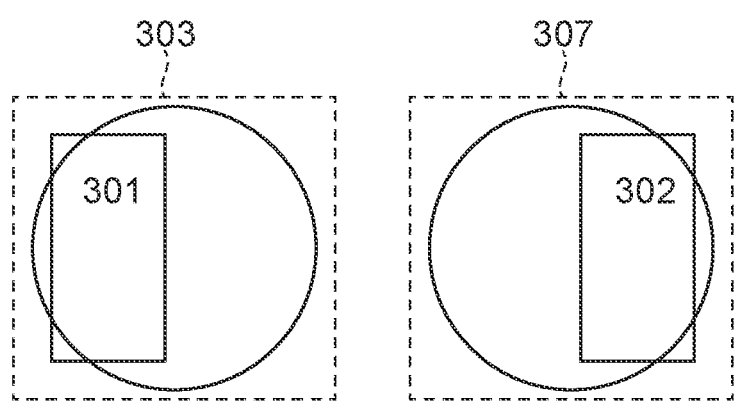
FIG. 13 shows the configuration of a variation of each pixel of the image pickup device.

For example, in each of the above-described embodiments, phase difference detection was executed by applying filter processing to two image signals output by two photoelectric conversion elements that receive light fluxes with different incident directions in a single pixel. However, as shown in FIG. 13, the present invention can also be applied when two pixels 303 and 307 each have only one photoelectric conversion element 301 and 302, respectively, and the photoelectric conversion elements 301 and 302 receive light fluxes with different incident directions from the same subject. In this case, phase difference detection is executed by applying filter processing to the two image signals output by the photoelectric conversion elements 301 and 302. In this case, the saturation evaluation value is calculated in the manner described in each embodiment using the saturation information of the two image signals output by the photoelectric conversion elements 301 and 302.

In the above-described embodiments, examples of the application of the present invention to image pickup apparatus are described. However, the devices to which the present invention can be applied are not limited to image pickup apparatus; for example, it may be applied to ranging devices.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-075225, filed Apr. 27, 2021, which is hereby incorporated by reference herein in its entirety.

What is claimed is:

1. A signal processing apparatus comprising:
at least one memory storing a program; and
one or more processors which, by executing the program, function as a plurality of units comprising:
(1) an obtaining unit configured to obtain a plurality of frames of image signals from a plurality of photoelectric conversion units, the plurality of photoelectric conversion units receiving light fluxes with different incident directions from an object;
(2) an information receiving unit configured to receive saturation information indicating whether the obtained image signals are saturated or not;
(3) a filter arithmetic unit configured to subject image signals of the plurality of frames to filter processing, thereby calculating image signals subjected to filter processing;
(4) an evaluation value calculation unit configured to calculate a multivalued saturation evaluation value that indicates the reliability of the image signals subjected to filter processing using the saturation information of the image signals of the frames most recently output; and
(5) a phase difference detection unit configured to determine whether or not to use the image signals subjected to filter processing for phase difference detection, based on the calculated saturation evaluation value,
wherein the evaluation value calculation unit is configured to count up or down the saturation evaluation value based on the saturation information of the image signals of the most recently output frames to calculate a new saturation evaluation value.

2. The signal processing apparatus according to claim 1, wherein the phase difference detection unit is configured to determine that the image signals subjected to filter processing are not used for phase difference detection when the calculated saturation evaluation value is greater than a predetermined threshold.

3. The signal processing apparatus according to claim 1, wherein the evaluation value calculation unit is configured to (1) count up the saturation evaluation value when the saturation information indicates that the image signals of the most recently output frames are saturated, and (2) count down the saturation evaluation value when the saturation information indicates that the image signals of the most recently output frames are not saturated.

4. The signal processing apparatus according to claim 1, wherein a count value used to count up or down the saturation evaluation value is set according to the number of image signals used in the filter processing.

5. The signal processing apparatus according to claim 4, wherein the count value is increased when the number of image signals of the frames output prior to the image signals of the most recently output frames used in the filter processing is less than or equal to a predetermined value.

6. The signal processing apparatus according to claim 2, wherein the predetermined threshold is set based on a centroid of phase characteristics of the filter processing.

7. The signal processing apparatus according to claim 1, wherein the evaluation value calculation unit is configured to calculate the saturation evaluation value by applying, to the saturation information of the image signals of the plurality of frames, the same filter processing as that executed by the filter arithmetic unit.

8. The signal processing apparatus according to claim 1, further comprising a storage unit configured to hold the calculated saturation evaluation value and the image signals subjected to filter processing.

9. The signal processing apparatus according to claim 1, wherein the filter processing is a moving average processing.

10. The signal processing apparatus according to claim 1, wherein the filter arithmetic unit is configured to have an IIR filter configuration.

11. The signal processing apparatus according to claim 1, wherein the filter arithmetic unit is configured to have an FIR filter configuration.

12. A signal processing method comprising:
obtaining a plurality of frames of image signals from a plurality of photoelectric conversion units, the plurality of photoelectric conversion units receiving light fluxes with different incident directions from an object;
receiving saturation information indicating whether or not the obtained image signals are saturated;
subjecting the image signals of the plurality of frames to filter processing, thereby calculating image signals subjected to filter processing;

calculating a multivalued saturation evaluation value that indicates the reliability of the image signals subjected to filter processing using the saturation information of the image signals of the most recently output frame; and determining whether or not to use the image signals subjected to filter processing for phase difference detection, based on the calculated saturation evaluation value, wherein the calculating includes counting up or down the saturation evaluation value based on the saturation information of the image signals of the most recently output frames to calculate a new saturation evaluation value.

13. A non-transitory storage medium storing a program that causes a computer to execute a signal processing method, the signal processing method comprising:

obtaining a plurality of frames of image signals from a plurality of photoelectric conversion units, the plurality of photoelectric conversion units receiving light fluxes with different incident directions from an object;

receiving saturation information indicating whether or not the obtained image signals are saturated;

subjecting the image signals of the plurality of frames to filter processing, thereby calculating image signals subjected to filter processing;

calculating a multivalued saturation evaluation value that indicates the reliability of the image signals subjected to filter processing using the saturation information of the image signals of the most recently output frame; and determining whether or not to use the image signals subjected to filter processing for phase difference detection, based on the calculated saturation evaluation value, wherein the calculating includes counting up or down the saturation evaluation value based on the saturation information of the image signals of the most recently output frames to calculate a new saturation evaluation value.

* * * * *